United States Patent [19]

Gorniak et al.

[11] Patent Number: 4,817,147
[45] Date of Patent: Mar. 28, 1989

[54] INTELLIGENT SYNCHRONOUS MODEM AND COMMUNICATION SYSTEM INCORPORATING THE SAME

[75] Inventors: Andrew M. Gorniak, Oxford, Conn.; Michael J. Fargano, Silverton, N.J.

[73] Assignee: General DataComm, Inc., Middlebury, Conn.

[21] Appl. No.: 798,897

[22] Filed: Nov. 18, 1985

[51] Int. Cl.[4] .............................................. H04L 9/02
[52] U.S. Cl. ........................................ 380/49; 379/98; 370/32
[58] Field of Search ........................... 179/2 DP, 15 S; 364/200, 900; 379/98; 370/32, 91; 380/48, 49, 52

[56] References Cited

U.S. PATENT DOCUMENTS

| | | | |
|---|---|---|---|
| 4,091,423 | 5/1978 | Branscome | 380/43 |
| 4,215,243 | 7/1980 | Maxwell | 364/200 |
| 4,387,440 | 6/1983 | Eaton | 364/900 |
| 4,494,232 | 1/1985 | Dambrackas et al. | 370/80 |
| 4,547,880 | 10/1985 | De Vita et al. | 370/91 |
| 4,549,302 | 10/1985 | Heaterington | 179/2 DP |
| 4,620,294 | 10/1986 | Leung et al. | 364/900 |

Primary Examiner—Salvatore Cangialosi
Assistant Examiner—Bernarr Earl Gregory
Attorney, Agent, or Firm—David P. Gordon

[57] ABSTRACT

An intelligent synchronous modem and data communication systems utilizing the intelligent synchronous modem are provided. The modem comprises: at least one connector having a first and a second port for primary and secondary channels of communication with a host computer, wherein the primary communication channel is for communication of synchronous data and the secondary communication channel is for communication of asynchronous data; a microprocessor for recognizing and executing commands of the host computer, wherein the commands are in the form of asynchronous data received over the secondary communication channel and interface means for interfacing the microprocessor with telephone lines, wherein synchronous data received by the microprocessor is sent to the interface means.

The data communication system of the invention comprises: a host computer including asynchronous and synchronous communication ports, wherein the host computer is arranged to send command mode data through the asynchronous port, and data mode data through the synchronous port; and intelligent synchronous modem as described above; at least one cable for connecting the synchronous port of the host computer with said synchronous port of the modem, and for connecting the asynchronous port of the host computer with the asynchronous port of the modem; and code/-decode means for coding data received from the host computer into a synchronous format, and for decoding synchronous format data received from a second computer into data understandable by the host computer.

Preferably, the modem of the invention is arranged to permit the conversion of the modem from an intelligent synchronous modem into an intelligent asynchronous modem through the use of data path logic circuitry which is controlled by the microprocessor of the modem.

17 Claims, 3 Drawing Sheets

INTELLIGENT SYNCHRONOUS MODEM AND COMMUNICATION SYSTEM INCORPORATING THE SAME

BACKGROUND

This invention relates generally to modems and communication systems for the transmission of data over a switched network. More particularly, this invention relates to an intelligent synchronous modem and a communication system incorporating an intelligent synchronous modem which will permit the interface of a microcomputer or personal computer with a mainframe computer requiring synchronous communication.

Both synchronous modems and intelligent asynchronous modems are known in the art. Typically, database services utilize mainframes which communicate in an asynchronous mode. Thus, with an intelligent asynchronous modem, a user could insert a disk with communication software into his PC and start the program. The software, in command mode, then instructs the modem to dial the telephone number keyed in by the user with the command: ATD (xxx) xxx-xxxx; where "AT" means "attention", and "D" means "dial the following number". The modem will then dial the given number and interrupt the PC with the message "CONNECT" when the connection with the remote computer has been accomplished. The modem will then leave its "command mode" and enter its "data mode". Once in the data mode, the modem simply acts as a modulator/demodulator for whatever information is being transmitted between the computers. After data transmission is completed, the computer will then use command mode to instruct the modem to "hang up". Because the modem can understand when it is being commanded to enter the command and data modes, it is called an "intelligent" modem. Those skilled in the art will understand that the nature of asynchronous communication permits the implementation of such an intelligent modem, as asynchronous data is sent at whatever rate it is received, and it is not enveloped with excess information which must be stripped to understand the data. Thus, the appearance of particular control language, in any location and at any time in the data stream, will cause the intelligent modem to enter or leave command mode.

Often, in large corporations, computer systems are arranged for synchronous communication, and synchronous modems have long been available to facilitate transmission of synchronous messages. Synchronous data is sent according to a particular protocol and according to a clock. Because a protocol is used, a PC must be arranged to talk according to that protocol. Typically, a "SYNC card" is used to generate the proper protocol and thus translate the information being output by the PC into properly formatted information. The information may then be sent via the modem to the mainframe computer. The modem's function in such an arrangement is simply to convert each bit of information into phone line compatible information. Because the information is being sent according to a complex protocol, the modem (without the use of expensive and sophisticated hardware) is incapable of determining whether any of the information is meant for it rather than the distant computer. Thus, the synchronous modems of the art are non-intelligent. They act in "data mode" only and simply pump the information through the line. Typically, all "command mode" information is accomplished manually such that operators place the calls to the mainframe and manually transfer the line to the modem of the PC.

SUMMARY OF THE INVENTION

It is therefore an object of the invention to provide an intelligent synchronous modem.

It is a further object of the invention to provide a communication system having an intelligent synchronous modem as a component.

In accordance with the objects of the present invention, an intelligent synchronous modem is provided and broadly comprises:

(a) at least one connector having a primary and a secondary port for primary and secondary channels of communication with a host computer, wherein the primary communication channel is for communication of synchronous data and the secondary communication channel is for communication of asynchronous data;

(b) a microprocessor for receiving, recognizing, and executing commands of said host computer, wherein said commands are in the form of asynchronous command data received over said secondary communication channel; and (c) interface means for interfacing said microprocessor with telephone lines, wherein synchronous data mode data received by said microprocessor from said host computer is sent to said interface means.

Preferably, the intelligent synchronous modem further comprises scrambling means for scrambling synchronous data into a proper format for transmittal to a remote computer via telephone lines, and for unscrambling data coming into the scrambling means from a remote computer. Also, preferably, the microprocessor of the intelligent synchronous modem is arranged to modulate the synchronous data received for output to a remote computer, and typically outputs that modulated data in an eight-bit parallel format. The interface means of the modem is arranged to convert the parallel data received from said microprocessor into serial format, to convert digital information into analog information for transmission over the telephone lines, to convert incoming analog information into digital information, and to filter frequencies so as to separate transmit and receive signals. Further, the modem of the invention is preferably arranged to permit the conversion of the modem from an intelligent synchronous modem into an intelligent asynchronous modem through the use of data path logic circuitry which is controlled by the microprocessor of the modem.

According to another aspect of the invention, a data communication system is provided and comprises:

(a) a host computer including asynchronous and synchronous communication ports, wherein said computer is arranged to send command mode data through said asynchronous port, and data mode data through said synchronous port;

(b) an intelligent synchronous modem, including
first and second ports for primary and secondary channels for communication with said host computer, wherein the primary communication channel is for communication of data mode data and the secondary communication channel is for communication of command data,
a microprocessor for receiving, recognizing, and executing commands of said host computer, wherein said commands are in the form of asynchronous command data received over said secondary communication channel, and interface means for interfacing said microprocessor with telephone lines;

(c) at least one cable for connecting said synchronous port of said host computer with said synchronous port of said modem, and for connecting said asynchronous port of said host computer with said asynchronous port of said modem; and (d) code/decode means for coding raw data of said host computer into a synchronous protocol, and for decoding synchronous protocol data received from a remote computer into data understandable by said host computer.

A better understanding of the invention, and additional advantages and objects of the invention will become apparent to those skilled in the art upon reference to the detailed description and the accompanying drawings.

DETAILED DESCRIPTION

Figure 1:
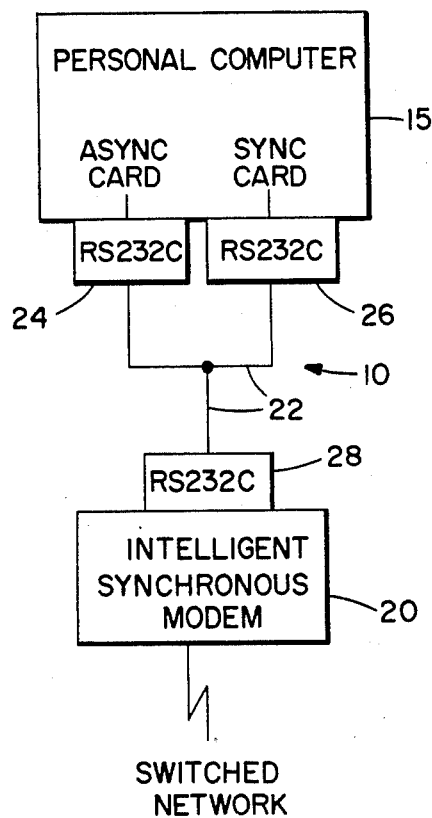
FIG. 1 is a schematic diagram of the data communication system of the invention.

Turning to FIG. 1, the data communication system 10 of the invention generally comprises a host computer 15, an intelligent synchronous modem 20, and a cable 22 connecting the modem 20 to the host computer 15. The host computer 15 is typically a personal computer or the like, which is arranged to have a connector 24 for an asynchronous port, and a second connector 26 for a synchronous port. The computer 15 is further arranged to send (and receive) asynchronous data from the asynchronous port, and synchronous data from the synchronous port. When the system is in its intelligent synchronous mode, the asynchronous data sent from the asynchronous port is "command mode" data intended for use by the modem itself, while the synchronous data sent from the synchronous port is "data mode" data intended for communication with a second or remote (mainframe) computer.

The intelligent synchronous modem 20 of the system invention has a connector 28 which includes a first port for a primary communication channel for communication of synchronous data, and a second port for a secondary communication channel for communication of command data. The port of the primary channel preferably consists of the standard configuration of connector pins used on most modems of the art. The port of the secondary channel preferably consists of the secondary pins of the RS232 connector which are known as the secondary RS232 EIA signals. The modem 20 also includes a microprocessor for receiving, recognizing, and executing the asynchronous data commands of the host computer, and an interface means for interfacing the microprocessor with telephone lines. A more complete description of the components and working of the modem 20 will be had hereinafter with reference to FIG. 2.

The primary and secondary communication channels for the transfer of synchronous and asynchronous data are contained in "Y"-cable 22 which connects connectors 24 and 26 of the host computer 15 with connector 28 of modem 20. It should be appreciated that two (or more) cables could be used to house the primary and secondary channels, provided proper connectors are provided. Moroever, as will be described hereinafter with reference to FIG. 4, if a host computer having a single connector housing two ports was provided, a single standard cable could be used. However, with the standard computer arrangements presently available, the Y-cable offers the advantages of requiring only a single cable, and negating the extra cost of additional connectors on the modem end.

Finally, with reference to the components of the data communication system 10 of the invention, system 10 requires a coding/decoding means for coding raw data of the host computer into a synchronous protocol for transfer through the microprocessor of the modem 20 to the interface means of the modem 20, and for decoding synchronous protocol data received from a remote computer into data understandable by said host computer. Those skilled in the art will recognize that the required coding/decoding means is preferably a part of the host computer 15 itself or a stand alone component. "Sync Cards" for computers, which are known in the art, are typically suitable as code/decode means. The Sync Cards of the art take the data or code of a personal computer and codes it into the required protocol such as HDLC/SDLC or BISYNC. The code/decode means thus acts to take raw data of the host computer 15, and translate them into a complex protocol which is understood by a remote mainframe.

Figure 2:
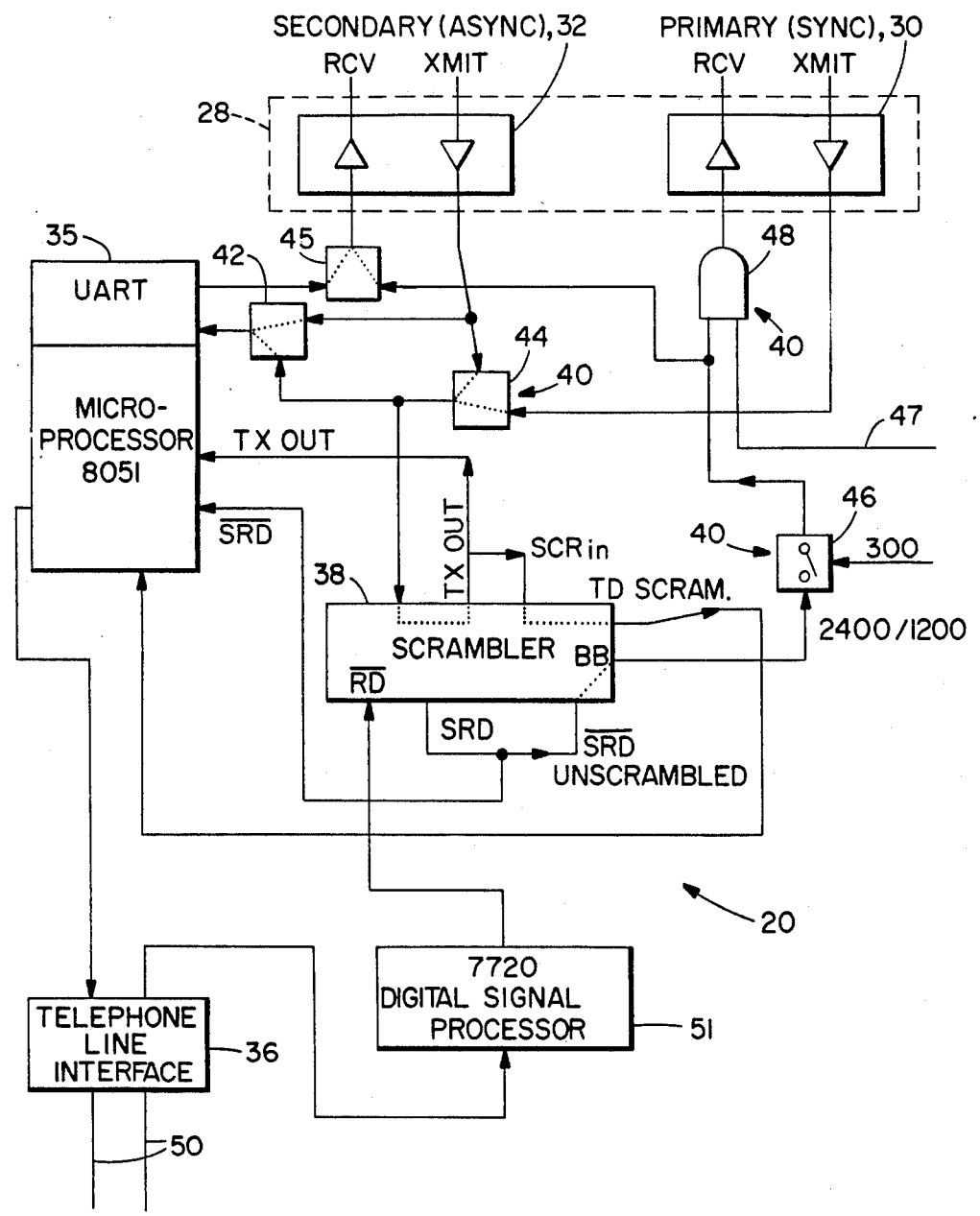
FIG. 2 is a data flow chart of the intelligent synchronous modem of the invention.

Turning to FIG. 2, the data path and the components of the intelligent synchronous modem 20 of the invention is seen. To function effectively, the modem 20 need only include a single connector 28 housing ports 30 and 32 for receiving a primary communication channel and a secondary communication channel respectively. The primary communication channel is preferably designated for the communication of synchronous data, while the secondary channel is designated for the communication of asynchronous data with the host computer 15. The intelligent synchronous modem invention 20 further includes a microprocessor 35 for receiving, recognizing, and executing commands of the host computer, wherein the commands are in the form of asynchronous data received via the secondary communication channel, and interface means 36 for interfacing the microprocessor 35 with telephone lines 50, wherein synchronous data received by the microprocessor 35 is passed through to the interface means 36. Also, as will be described hereinafter in detail, the modem 20 preferably further comprises scrambling means 38 as is known in the art for scrambling synchronous data into a proper format for transmittal to and receipt by a remote computer via telephone lines 50, and for unscrambling data coming into the scrambling means 38 from a remote computer. Finally, data path logic circuitry 40, comprising switches and gates 42, 44, 45, 46, and 48 is preferably provided to permit the conversion of the modem 20 from an intelligent synchronous modem into an intelligent asynchronous modem.

As aforementioned, the modem invention 20 includes a connector 28, such as an RS232 connector for receiving primary and secondary data communication channels. The connector 28 can be thought of as having two ports 30 and 32, each port connecting to a receive line and a transmit line in the Y cable. Thus, data entering the modem 20 from the host computer 15 enters on the transmit line, and data being sent to the host computer 15 from the modem 20 leaves on the receive line. Those skilled in the art will appreciate that the naming of the transmit and receive lines according to the direction of data flow is governed by convention.

In the intelligent synchronous modem 20, a primary channel is designated to receive and transmit synchronous data. The synchronous data received and transmitted is "data mode" data, and does not include any "command mode" data. A secondary channel likewise is designated to receive and transmit asynchronous data, which includes only "command mode" data and no "data mode" data. Again, those skilled in the art will appreciate that the terminology "primary" and "secondary" channels is one of convenience, and that, if desired the type of information received on each may be reversed. Nevertheless, it should be appreciated that commands are received by the modem 20 via the asynchronous channel, and data for transmittal to the mainframe is received by the modem via the synchronous channel.

Figure 3:
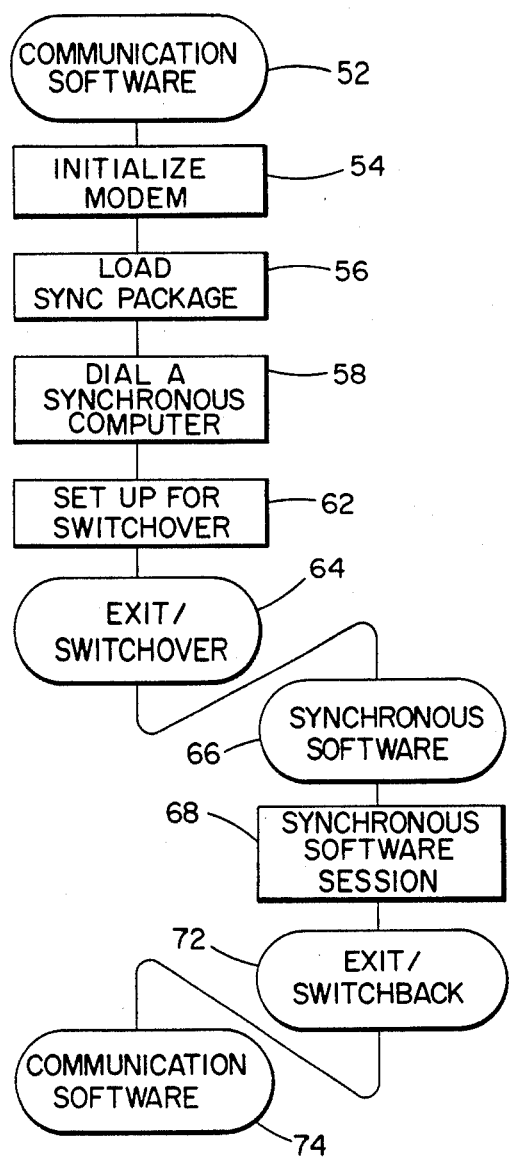
FIG. 3 is a flow chart of the software logic controlling the data communication system invention of FIG. 1.

Turning to FIG. 3 in conjunction with FIG. 2, a flow chart is provided of the software controlling computer 15 which permits a user of the host computer 15 to communicate with a mainframe computer via modem 20. Typically, having previously set the connector and cable arrangements as provided by FIG. 1, a user would load asynchronous communication software into the memory of host computer 15 and execute the program at 52. Then, by issuing asynchronous command strings to the microprocessor 35 of the modem 20 via the secondary channel (which is always connected to the microprocessor), the user of computer 15 would initialize the modem parameters at 54 (i.e. direct the setting of switches 42, 44, 45, and 46, and the second input 47 into AND gate 48), to prepare for a synchronous connection. A synchronous software package could then be loaded at 56 into a predetermined location in the computer memory, such that it is co-resident in memory with the asynchronous software package. The computer 15 and modem 20 will then be set to make contact with a second (mainframe) computer.

At 58, the user of computer 15 should issue an asynchronous "dial command" to the modem 20 via the secondary channel. The command string, which directs the modem to contact a computer using synchronous protocol, proceeds through the transmit line of port 32 and through switch 42 to the universal asynchronous receiver transmitter (UART) section of microprocessor 35. According to the preferred embodiment, an eight-bit microprocessor such as an Intel 8051 will suffice for the applications used herein, although depending on the applications different microprocessors of different capacities could be used. Because, in the intelligent synchronous modem mode, switch 44 is closed in the direction of the primary channel, it is open in the direction of the secondary channel. Hence, the dial command string (or any asynchronous command string) is not sent to scrambler 38 for delivery to the phone lines.

Upon receiving the "dial" command, the microprocessor 35 performs different functions as are well known in the art to establish contact with the synchronous mainframe computer. Upon establishing contact, the microprocessor 35 of modem 20 sends an asynchronous signal to computer 15 via switch 45 and the receive line of port 32 to inform computer 15 of the contact. After receiving a signal that contact has been made, computer 15 sets and holds the RS232 interface signals at 62 as required to maintain a synchronous connection. Then, either automatically, or by the request of the user, the synchronous software is addressed at 64, and executed at 66 such that any data leaving computer 15 thereafter will be sent via the primary channel. This switch-over from the asynchronous to the synchronous software package may require the use of interrupt handling techniques known in the art. Thus, at 68, the host computer 15 and mainframe computer are in contact, and data transfers may be had in a synchronous fashion.

In order to permit a meaningful transfer of information, switch logic 40 must be properly set by the modem microprocessor 35 to connect the modem microprocessor 35, the scrambling means 38, and the synchronous port 30. Thus, synchronous information being sent by the host computer 15 is received at the synchronous port 30 of connector 28. The information or data is sent through switch 44 to the scrambling means 38 where clock information and the synchronous data which is in its proper protocol are merged. The scrambled data is then sent via the TD (transmit data) output of means 38 to the microprocessor 35. Provided the handshaking and other status information being received by the microprocessor 35 from scrambling means 38 (via transmit data out (TX out) and serial receive data (SRD)) is proper, the microprocessor 35 modulates the signal so that it may be properly sent over telephone wires 50. The microprocessor then forwards the information to interface means 36. Interface means 36 serves to convert the digital information received from the microprocessor 35 into analog signals for transmission over telephone wires 50. Interface means 36 further serves as a frequency filter to separate signals which are being transmitted from signals which are being received. Moreover, because the microprocessor typically is arranged to output information in a parallel format, the interface means 36 can be arranged to convert parallel information received from the microprocessor into serial format.

Information being sent from the remote mainframe computer over telephone lines 50 to host computer 15 is also received by telephone line interface means 36 which converts the analog information into digital data. The digital data is then demodulated by a digital signal processor 51 such as the 7720 DSP chip of the NEC Corporation of Massachusetts, and sent to scrambler 38 which descrambles the synchronous data. The synchronous data are sent via port BB of means 38 through switch 46, AND gate 48, and port 30 of connector 28, to computer 15 via the primary channel. Because switch 45 is open to the information leaving decoder 38, no synchronous information is transmitted over the secondary channel.

It will be appreciated that the data path logic circuitry is controlled by microprocessor 35. Switch 46 is used to select the receiver (which matches the baud rate) for the incoming information. AND gate 48 is used in the intelligent synchronous modem mode to block incoming data if it is determined that the quality of the incoming information is subpar or the like. The microprocessor 35 controls the setting of the second input into AND gate 48, and uses information leaving the digital signal processor 51 to make such a determination.

After the communication session consisting of transferring data between host computer 15 and a mainframe is completed, computer 15 may be directed at 72 to exit the synchronous software package and return to the asynchronous package resident in memory. This direction can either take the form of a direct command from the user, or a command appended to the end of the synchronous software package or other automatic means. Thus, if no further data is being transmitted, the software might direct itself to the address of the asynchronous package. Or, if a master program or shell is utilized, the asynchronous package and synchronous packages may be called and swapped in and out as required. Regardless, the computer 15 would return at 74 to the situation existant at 52 where any additional communication to other computers would require additional initialization, etc.

Those skilled in the art should appreciate that the arrangement of modem 20 of the invention as shown in FIG. 2 permits the conversion of the modem from an intelligent synchronous modem into an intelligent asynchronous modem through the use of data path logic circuitry. Thus, if desired, the parameters of modem 20 may be switched into the asynchronous mode by using only the secondary channel, by setting the input 47 into AND gate 48 low, by closing switch 44 in the direction of port 32, and by having switch 45 switch depending on whether data is coming from microprocessor 35 or from decoder 38. Of course, if "Y"-cable 22 is replaced by an ordinary cable which is attached to the asynchronous port and connector of host computer 15, the primary channel may be used and the switches set accordingly to provide the intelligent asynchronous modem.

In the intelligent asynchronous modem mode (using the Y-cable), the asynchronous software is loaded into memory and executed. With the parameters properly set, the host computer 15, by direction of the user, issues an asynchronous command string to dial a remote computer system that utilizes asynchronous communication. The command string is received at port 32, and with switches 42 and 44 closed in the direction to receive the command string, the command is sent to both the microprocessor 35 and the scrambler 38. Because the microprocessor 35 can decipher the simple asynchronous command string, it enters its command mode and ignores the data being forwarded to it from the TXout port of the scrambler 38. Instead, it follows the directions of the command string to dial a number and establish contact with an asynchronous computer. When contact is made, the microprocessor 35 forwards a command mode message to the host computer 15 via switch 45 and port 32 of connector 28.

When the user desires to send data to the second computer, the user directs the host computer 15 to send a command mode message to the microprocessor 35 to enter the "data mode". Data sent thereafter is still received by both the microprocessor 35 and the scrambler 38. However, instead of ignoring the data being sent by the scrambler 38, the microprocessor 35 modulates the information and sends it to the telephone line interface 36 for parallel to serial and digital to analog conversion. It should be appreciated that in the asynchronous mode, the scrambler 38 is arranged not only to scramble the data received from the host computer 15, but to take the asynchronous data and convert it into clocked data which can be transmitted over phone lines 50. The scrambler 38 is informed of which mode it is operating in by an information bit from the microprocessor 35. It should also be appreciated that, in the asynchronous mode, the microprocessor 35 continues to monitor the data being sent from the host computer 15. Thus, when the microprocessor is properly signalled, it can reenter the command mode and stop the data transmission.

Data being received from a remote computer in the intelligent asynchronous mode is received via telephone lines 50 at the interface means 36 where it is filtered and undergoes and A/D conversion. The data are then sent through demodulator 51 to scrambler 38 which unscrambles the incoming clocked data and strips the clocking information from it. The unscrambled asynchronous signal is then sent to host computer 15 via switch 46, switch 45, and port 32. As aforementioned, in the asynchronous mode utilizing the "Y"-cable 22, the controllable input 47 to AND gate 48 is set low by the microprocessor 35 such that no information may pass through the primary channel. Thus, in order for information to pass through the secondary channel, switch 45 must be closed by microprocessor 35 in the direction permitting data to flow from the decoder 38 to port 32. Thus, switch 45 switches its position in the asynchronous mode depending on the direction data is flowing. If, at any time, information simultaneously appears at switch 45 from both the microprocessor 35 and the decoder 38, the switch preferably closes to permit the microprocessor information to flow. Also, if at any time, the "Y"-cable 22 is replaced by a standard cable, the microprocessor 35 of the modem will sense the change and redirect the switching network 40 so that the primary channel can be used by the intelligent asynchronous modem.

The modem 20 of the invention, if required, may also act in a "dumb" asynchronous or "dumb" synchronous mode. In both cases, only a single cable is used rather than the Y-cable of the invention, and the host computer 15 is connected to the modem 20 by the primary channel. Switch 45 is opened completely so that no data may flow through, and switches 42 and 44 are closed in the direction of the transmit line of port 30 so that data may flow from the host computer 15 to both the microprocessor 35 and scrambler 38.

Figure 4:
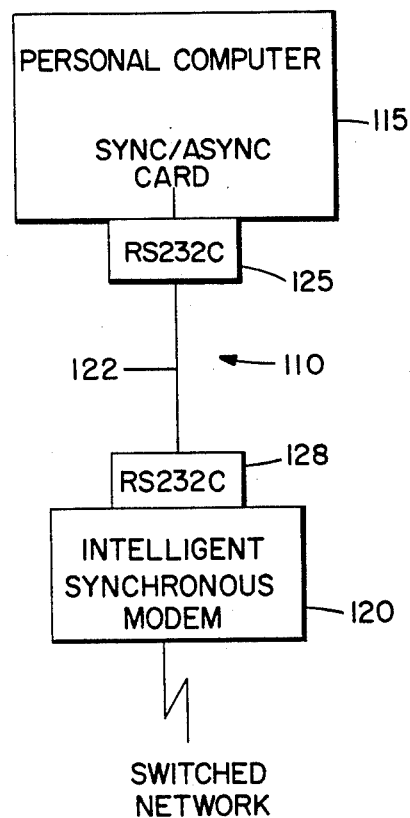
FIG. 4 is an alternative embodiment of the data communication system of the invention.

Turning to FIG. 4, an alternative embodiment of the data communication system of the invention is seen. The alternative data communication system 110 of the invention generally comprises a host computer 115, an intelligent synchronous modem 120, and a standard cable 122 connecting the modem 120 to the host computer 115. The host computer 115 is typically a personal computer or the like, which is arranged to have a single connector 125. Thus, it will be recogized that the Sync and Async Cards of the art are combined into a single card handling both functions. For purposes of understanding, the asynchronous and synchronous ports of the computer 115 can be thought of as being located in a position more internal to the computer than connector 125. Thus, the computer 115 sends and receives asynchronous data from an asynchronous port and synchronous data from a synchronous port by funneling the data into the primary pins of connector 125. In addition to the primary pins, the SEC RTS pin 19 is used to provide information as to whether the data being supplied is coming from the asynchronous port of computer 115 or the synchronous port. The data, including the pin 19 information are then sent to modem 120 over cable 122.

The intelligent synchronous modem 120 of the system invention 110 also has a single connector 128.

Again, for purposes of understanding, the synchronous and asynchronous ports of the modem 120 can be thought of as being more internal to the modem 120 than the connector 128. When data is sent by computer 115 to modem 120, the connector 128 of the modem 120 acts as a switch to channel the data to the synchronous port or to the asynchronous port depending on the information received regarding pin 19. Thus, in effect, the SEC RTS pin 19 is used as a control mechanism to multiplex asynchronous control data and synchronous data mode data over the primary RS232 channel, where the asynchronous data sent from the asynchronous port is "command mode" data intended for use by the modem itself, while the synchronous data sent from the synchronous port is "data mode" data intended for communication with a remote computer.

As with the modem 20 of the system invention 10, modem 120 of system 110 also includes a microprocessor for receiving, recognizing, and executing the asynchronous data commands of the host computer and performing other functions as described above with regard to the description of microprocessor 35 of system 10, and an interface means for interfacing the microprocessor with telephone lines and performing the functions as described above with regard to interface means 36 of the system 10. The modem 120 also preferably includes a scramler, switch logic, and a digital signal processor, which all perform the functions described above with regard to the description of similar components of modem 20 of system invention 10.

Those skilled in the art will appreciate that the communication system 110 utilizing the intelligent synchronous modem 120, can also be used to communicate in an intelligent asynchronous environment. Thus, pin 19 of connector 125 can either be fixed to indicate the flow of asynchronous information, or pin 19 information need not be sent to modem 120 at all. Regardless, the microprocessor of the modem 120 is used to set all the switches of the modem as in the embodiment of system 10 and modem 20 where a single cable and the primary channel are used.

Those skilled in the art will also appreciate that the communication system 110, while described above for purposes of understanding as only using a single (primary) communication channel, may also be thought of as having both primary and secondary channels. The "primary" channel is from the synchronous port of Sync/Async Card of computer 115, to the primary pins of connector 125, through cable 122, to the primary pins of connector 128, and to the synchronous port of the modem 120. The "secondary" channel would be from the asynchronous port of the Sync/Async Card of computer 115, to the primary pins of connector 125, through cable 122, to the primary pins of connector 128, and to the asynchronous port of the modem 120. Thus, while data is passing only from the primary pins of one connector to the primary pins of a second connector, through a single cable, both a "primary" and "secondary" channel of communication exist. Moreover, if desired, both the asynchronous and synchronous ports of both modem 120 and computer 115 may be thought of as being located in connectors 128 and 125 respectively, as the exact "location" of a port is nebulous and unimportant. Thus, it will be appreciated that the alternative embodiment 110 of the system invention is simply an equivalent of system invention 10.

There has been described and illustrated herein an intelligent synchronous modem and communication systems incorporating such an intelligent synchronous modem. While particular embodiments of the invention have been described, it is not intended that the invention be limited thereby, as it is intended that the invention be broad in scope and that the specifications be read likewise. Thus, those skilled in the art will appreciate that a plethora of changes could be made to the details of the circuitry and the software without deviating from the invention. For example, the data path "switches" of the invention can be implemented in firmware, and/or as hardware. Likewise, the control of the user over the procedures and the parameters can range widely from permitting or requiring a step-by-step intervention of the user to an automatic procedure which has a minimum of user intervention.

It further will be understood that the different components of the modem can be combined or split so that one chip could assume the functions of others, or so that many discrete components are used instead of integrated circuits. Moreover, while the computer was described as having either one or two connectors depending on the system embodiment, and the modem was described as having a single connector for both embodiments, those skilled in the art will appreciate that it is a matter of choice whether to maintain separate Sync and Async Cards with their respective connectors on the computer end or to provide two connectors on the modem end, as any combination of the same could be accommodated in both system embodiments. Likewise, depending on the number and location of connectors, the connection between the computer and the modem may range from a single cable, a Y-cable, two cables, or even a "wishbone" cable (inverse Y), depending on the circumstances. Therefore, it will be apparent to those skilled in the art that other changes and modifications may be made to the invention as described without departing from the spirit and scope of the invention as so claimed.

We claim:

1. An intelligent synchronous modem comprising:
   (a) at least one connector having a plurality of pins, a first distinct set of pins comprising a first port for a primary channel of communication with a host computer and a second distinct set of pins comprising a second port for a secondary channel of communication with a host computer, wherein the primary communication channel is for communication of data mode data and the secondary communication channel is for communication of command mode data;
   (b) a microprocessor for receiving, recognizing, and executing commands of said host computer, wherein said command mode data are in the form of asynchronous data received over said secondary communication channel; and
   (c) interface means for interfacing said microprocessor with a telephone line, wherein said data mode data received by said microprocessor are sent to said interface means, and wherein said data mode data are in the form of synchronous data.

2. An intelligent synchronous modem according to claim 1, wherein:
   data mode and command mode data may be simultaneously communicated over said primary and secondary channels.

3. An intelligent synchronous modem according to claim 2, further comprising:

(d) scrambling means for scrambling said synchronous data into a proper format for transmittal to a second computer via said telephone line, and for unscrambling data coming into said scrambling means from said second computer; and (e) data path logic circuitry, wherein said microprocessor is arranged to modulate the synchronous data received for sending to said interface means;

said microprocessor outputs said modulated synchronous data in a digital parallel format; and said interface means is arranged to convert said parallel digital data received from said microprocessor into an analog serial format.

said microprocessor controls said logic circuitry, said data path logic circuitry is arranged to permit the conversion of the said modem into an intelligent asynchronous modem, and said scrambling means is arranged to convert asynchronous data coming from said host computer into clocked data for output to said microprocessor.

4. An intelligent synchronous modem according to claim 1, further comprising:

(d) scrambling means for scrambling said synchronous data into a proper format for transmittal to a second computer via said telephone line, and for unscrambling data coming into said scrambling means from said second computer.

5. An intelligent synchronous modem according to claim 4, wherein:

said microprocessor is arranged to modulate the synchronous data received for sending to said interface means.

6. An intelligent synchronous modem according to claim 5, wherein:

said microprocessor outputs said modulated synchronous data in a digital parallel format; and said interface means is arranged to convert said parallel digital data received from said microprocessor into an analog serial format.

7. An intelligent synchronous modem according to claim 4, further comprising:

(e) data path logic circuitry, wherein said microprocessor controls said logic circuitry, said data path logic circuitry is arranged to permit the conversion of the said modem into an intelligent asynchronous modem, and said scrambling means is arranged to convert asynchronous data coming from said host computer into clocked data for output to said microprocessor.

8. A data communication system, comprising:

(a) a host computer including asynchronous and synchronous communication ports, wherein said computer is arranged to send command mode data through said asynchronous port, and data mode data through said synchronous port;

(b) an intelligent synchronous modem, including first and second ports for primary and secondary channels for communication with said host computer, said first and second ports comprising first and second distinct sets of pins, wherein the primary communication channel is for communication of data mode data and the secondary communication channel is for communication of command mode data, a microprocessor for receiving, recognizing, and executing commands of said host computer, wherein said commands are in the form of asynchronous command data received over said secondary communication channel, and interface means for interfacing said microprocessor with a telephone line, wherein said data mode data received by said microprocessor are sent to said interface means, and wherein said data mode data are in the form of synchronous data;

(c) at least one cable for connecting said synchronous port of said host computer with said first port of said modem, and for connecting said asynchronous port of said host computer with said second port of said modem; and (d) code/decode means for coding data of said host computer into a protocol for synchronous communication, and for decoding synchronous communication protocol data received from a second computer into data understandable by said host computer.

9. A data communication system according to claim 8, wherein:

data mode and command mode data may be simultaneously communicated over said primary and secondary channels.

10. A data communication system according to claim 9, wherein:

said modem further includes scrambling means for scrambling said synchronous data into a proper format for transmittal to a second computer via said telephone line, and for unscrambling data coming into said scrambling means from said second computer, and said microprocessor of said modem is arranged to modulate the synchronous data received for sending to said interface means, said microprocessor of said modem outputs said modulated synchronous data in a parallel digital format, and said interface means of said modem is arranged to convert said parallel data received from said microprocessor into an analog serial format.

11. A data communication system according to claim 10, wherein:

said modem further includes data path logic circuitry, wherein, said microprocessor of said modem controls said logic circuitry, said data path logic circuitry is arranged to permit the conversion of said modem into an intelligent asynchronous modem, and said scrambling means is arranged to convert asynchronous data coming from said host computer into clocked data for output to said microprocessor.

12. A data communication system according to claim 11, wherein:

said host computer is arranged with two connectors, one of said connectors for said synchronous port of said host computer, and the other of said connectors for said asynchronous port of said host computer; and said at least one cable comprises a cable which connects on one end to said connector of said modem, and is split on its other end such that it is arranged to connect with said two connectors of said host computer.

13. A data communication system according to claim 8, wherein:

said modem further includes scrambling means for scrambling said synchronous data into a proper format for transmittal to a second computer via said telephone line, and for unscrambling data coming into said scrambling means from said second computer.

14. A data communication system according to claim 13, wherein:
said microprocessor of said modem is arranged to modulate the synchronous data received for sending to said interface means.

15. A data communication system according to claim 14, wherein:
said microprocessor of said modem outputs said modulated synchronous data in a parallel digital format; and
said interface means of said modem is arranged to convert said parallel data received from said microprocessor into an analog serial format.

16. A data communication system according to claim 13, wherein:
said modem further includes data path logic circuitry, wherein said microprocessor of said modem controls said logic circuitry,
said data path logic circuitry is arranged to permit the conversion of said modem into an intelligent asynchronous modem, and
said scrambling means is arranged to convert asynchronous data coming from said host computer into clocked data for output to said microprocessor.

17. A data communication system according to claim 8, wherein:
said host computer is arranged with two connectors, one of said connectors for said synchronous port of said host computer, and the other of said connectors for said asynchronous port of said host computer; and
said at least one cable comprises a cable which connects on one end to said connector of said modem, and is split on its other end such that it is arranged to connect with said two connectors of said host computer.

* * * * *